(12) United States Patent
Toillon et al.

(10) Patent No.: US 7,509,513 B2
(45) Date of Patent: Mar. 24, 2009

(54) FAULT-TOLERANT SYNCHRONISATION DEVICE FOR A REAL-TIME COMPUTER NETWORK

(75) Inventors: Patrice Toillon, Le Pecq (FR); Gerard Colas, Versailles (FR)

(73) Assignee: Thales (FR)

( * ) Notice: Subject to any disclaimer, the term of this patent is extended or adjusted under 35 U.S.C. 154(b) by 268 days.

(21) Appl. No.: 10/250,474

(22) PCT Filed: Dec. 20, 2001

(86) PCT No.: PCT/FR01/04119

§ 371 (c)(1),
(2), (4) Date: Jul. 2, 2003

(87) PCT Pub. No.: WO02/056176

PCT Pub. Date: Jul. 18, 2002

(65) Prior Publication Data

US 2004/0078614 A1 Apr. 22, 2004

(30) Foreign Application Priority Data

Jan. 16, 2001 (FR) .................................. 01 00542

(51) Int. Cl.
*G06F 1/12* (2006.01)
(52) U.S. Cl. ........................................ 713/375; 713/400
(58) Field of Classification Search ................ 713/375, 713/400
See application file for complete search history.

(56) References Cited

U.S. PATENT DOCUMENTS

| | | | |
|---|---|---|---|
| 4,287,596 A | * | 9/1981 | Chari .......................... 375/276 |
| 4,497,059 A | * | 1/1985 | Smith .......................... 714/797 |
| 4,644,498 A | * | 2/1987 | Bedard et al. .................. 714/3 |
| 4,696,019 A | * | 9/1987 | Tulpule et al. ............... 375/356 |
| 4,746,920 A | * | 5/1988 | Nellen et al. ............. 340/825.2 |
| 5,204,855 A | * | 4/1993 | Bebee et al. ................. 370/436 |
| 5,295,257 A | * | 3/1994 | Berkovich et al. .......... 713/400 |
| 5,402,394 A | * | 3/1995 | Turski .......................... 368/10 |
| 5,724,343 A | | 3/1998 | Pain et al. |

(Continued)

FOREIGN PATENT DOCUMENTS

| | | |
|---|---|---|
| WO | 97 43712 A | 11/1997 |
| WO | 00 16223 A | 3/2000 |

OTHER PUBLICATIONS

Oosterom, Marcel and Robert Babuska, Virtual Sensor for Fault Detection and Isolation in Filght Control Systems—Fuzzy Modeling Approach, Dec. 2000, Proceedings of the 39th IEEE Conference on Decision and Control, p. 2646.*

*Primary Examiner*—Tse Chen
(74) *Attorney, Agent, or Firm*—Lowe Hauptman Ham & Berner, LLP (57) ABSTRACT

Fault-tolerant synchronization of real-time equipment connected to a computer network of several tens of meters with an option of including or not including such equipment in the synchronization device is disclosed. Global scheduling of the real-time computer platform in the form of minor and major cycles is provided in order to reduce latency during sensor acquisition. The associated calculation and preparation of output to the actuator is provided in an integrated modular avionic (IMA) architecture. To achieve the foregoing, a synchronization bus separate from the data transfer network and circuits interfacing with this specific bus for processing the local real-time clocks in each piece of equipment in a fault-tolerant, decentralized manner is provided.

6 Claims, 8 Drawing Sheets

U.S. PATENT DOCUMENTS

| | | |
|---|---|---|
| 5,778,206 A | 7/1998 | Pain et al. |
| 5,872,827 A | 2/1999 | Eudeline et al. |
| 5,954,810 A | 9/1999 | Toillon et al. |
| 6,173,416 B1 | 1/2001 | Liddell et al. |
| 6,195,365 B1 | 2/2001 | Toillon |
| 6,289,024 B1 | 9/2001 | Toillon et al. |
| 6,397,243 B1 | 5/2002 | Colas et al. |
| 6,415,190 B1 | 7/2002 | Colas et al. |
| 6,477,382 B1 * | 11/2002 | Mansfield et al. ............ 455/458 |

* cited by examiner

FAULT-TOLERANT SYNCHRONISATION DEVICE FOR A REAL-TIME COMPUTER NETWORK

FIELD OF INVENTION

The present invention belongs to the field of hardware and software for fault-tolerant real-time computer networks. More specifically, it relates to the synchronization of equipment connected to said network.

The problem to be solved is the failure-free phasing of the real-time clocks of processing equipment connected by one or more data transfer networks. The fact of a reliable solution being provided to this problem is particularly important for the latency of data in the case of equipment on board aircraft, especially that which fulfills the functions of alarm, autopilot, flight plan, maintenance or service management.

BACKGROUND OF THE INVENTION

The relevant state of the art is represented by U.S. Pat. Nos. 5,307,409, 5,343,414, 5,386,424 and 5,557,623. These systems further form the subject of an ARINC 659 standard (Dec. 27, 1993) corresponding to a data transfer system via backplane bus.

The drawbacks of this state of the art are basically the short distance over which reliable synchronization is possible (approximately a meter owing to the need for a ground reference common to all the subscribers) and the lack of versatility of the system, all the equipment having to be synchronized, the backplane bus ensuring both data transfer and synchronization signals.

SUMMARY OF THE INVENTION

The device according to the invention can be used for reliable synchronization over several tens of meters and allows the choice of including or not including in the synchronization any equipment connected to the network by separating the data transfer and the synchronization bus of the equipment. This synchronization is less accurate than that of the ARINC 659 standard, but it enables using high-speed data transfers over much greater distances.

For these purposes, the invention provides a device for synchronizing the local real-time clocks of computer equipment connected to a data transfer bus including electronic circuits for generating synchronization pulses, counting circuits for generating the local real-time clock and exchanging pulses with the other synchronization entities, time voting circuits for resynchronizing the counting circuits. The pulses are conveyed via a specific synchronization bus.

BRIEF DESCRIPTION OF THE DRAWINGS

The invention will be better understood, and its various characteristics and advantages will emerge from the description that follows of an example of embodiment, and of its attached figures, in which.

DETAILED DESCRIPTION

Figure 1:
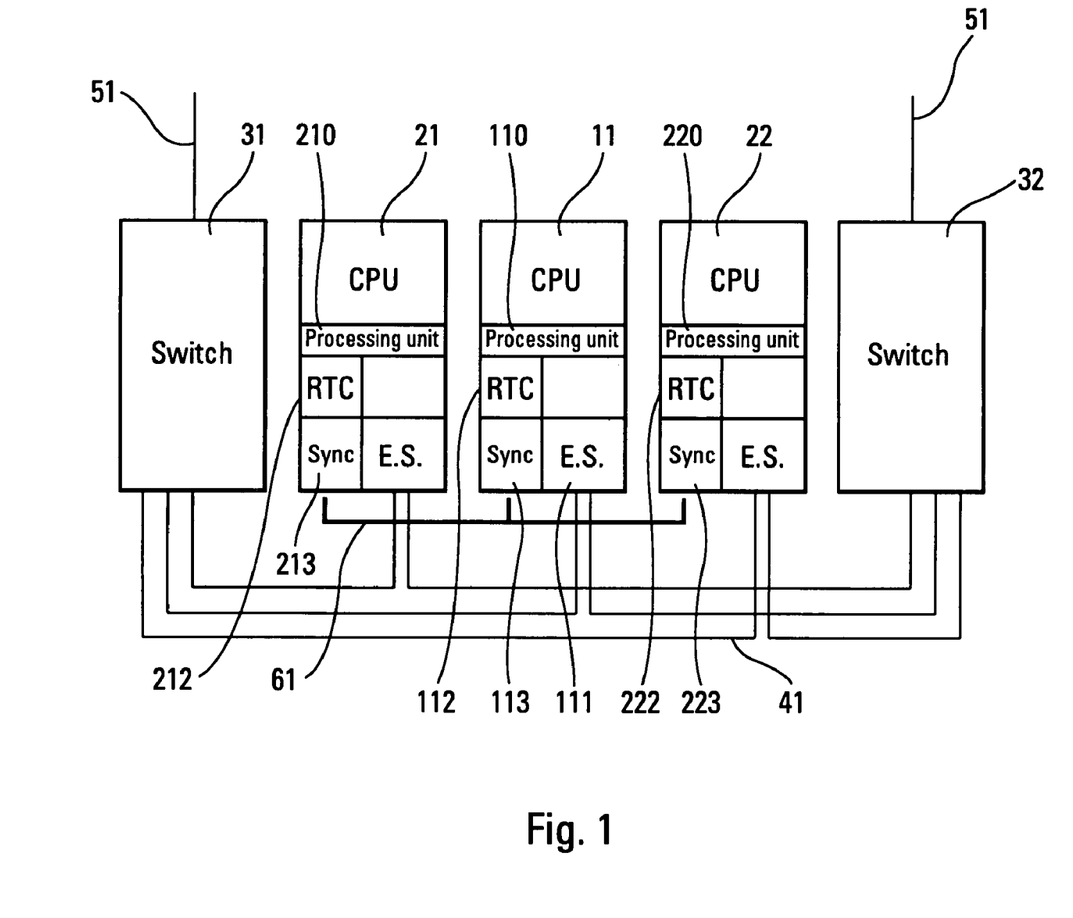
FIG. 1 shows the architecture of the synchronization platform according to the invention.

The computer platform in FIG. 1 includes at least one central processing unit or CPU 11, 21, 22, and cabinet switches 31, 32. The CPU 21, 22 can also be input/output (or I/O) units. This equipment is interconnected via a duplex data network 41 for example of the Full Duplex 100 MHz Ethernet type. The platform shown is connected to other different platforms via the switches 31, 32 and the bus 51.

The central processing units 11, 21, 22 each include an actual processing system 110, 210, 220 where the specific processing of the unit and the control of the data network are carried out via the End System or ES 111, a real-time clock or RTC 112, and a synchronization entity or Sync entity 113, 213, 223 according to the embodiments of the present invention.

The synchronization entities 113, 213, 223 are interconnected via a specific synchronization bus 61 separate from the data link 41, details of whose specific embodiments are provided farther on in the description.

Figure 2:
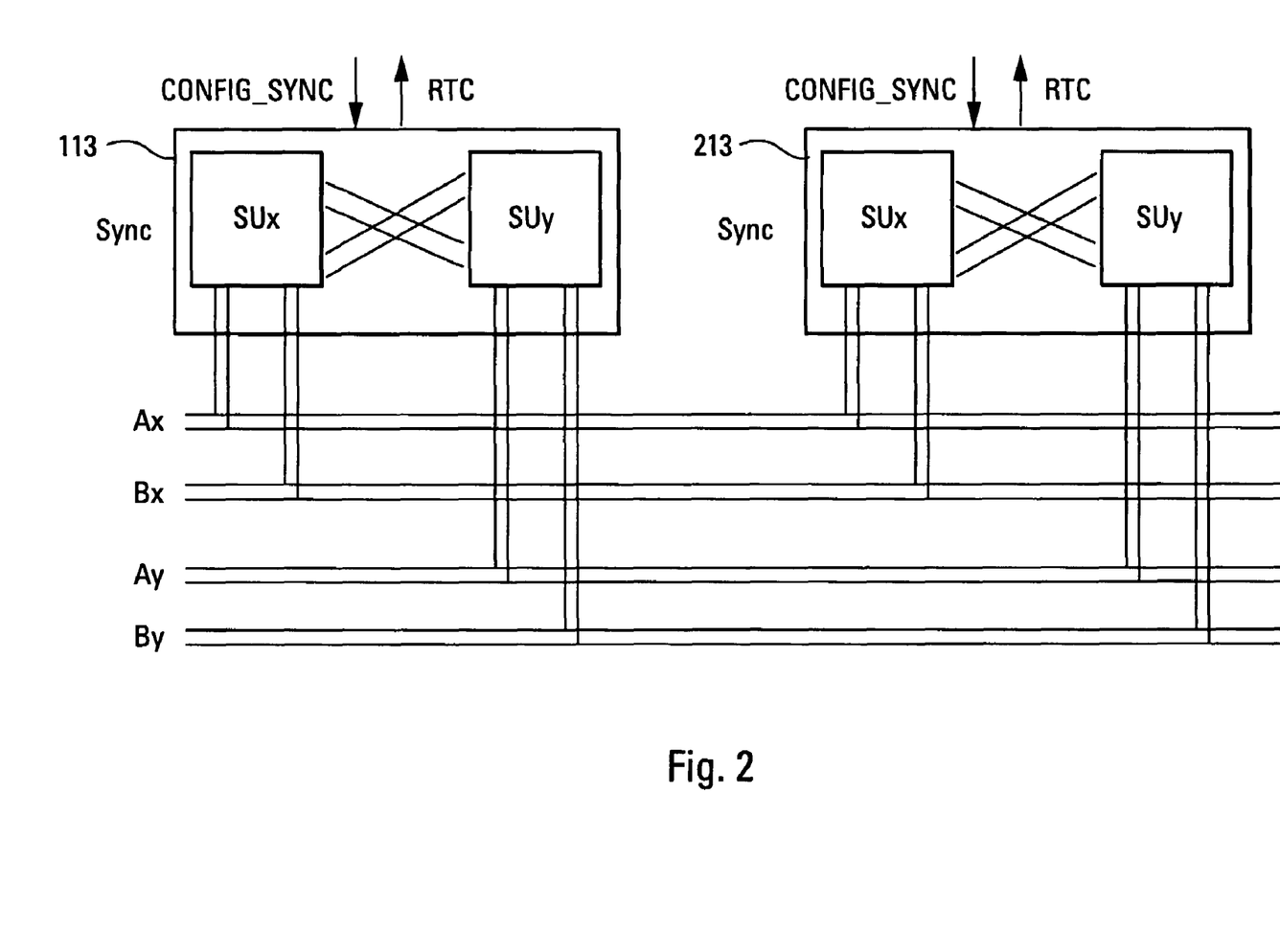
FIG. 2 shows the principle on which synchronization by the invention is based.

Referring to FIG. 2, the synchronization entities 113, 213, 223 are each composed of two synchronization restoring units $SU_x$ and $SU_y$, respectively. Each Sync entity 113, 213 (or 223, which is not shown) receives a synchronization configuration signal CONFIG_SYNC from its local processor 110, 210, 220, and sends back thereto a real-time clock signal RTC. As shown, each synchronization unit (respectively $SU_x$ and $SU_y$) respectively transmits two signals (respectively $A_x$, $B_x$ for $SU_x$, and $A_y$, $B_y$ for $SU_y$) or to the synchronization bus 61, and receives four signals $A_x$, $B_x$, $A_y$, and $B_y$ therefrom.

Figure 3:
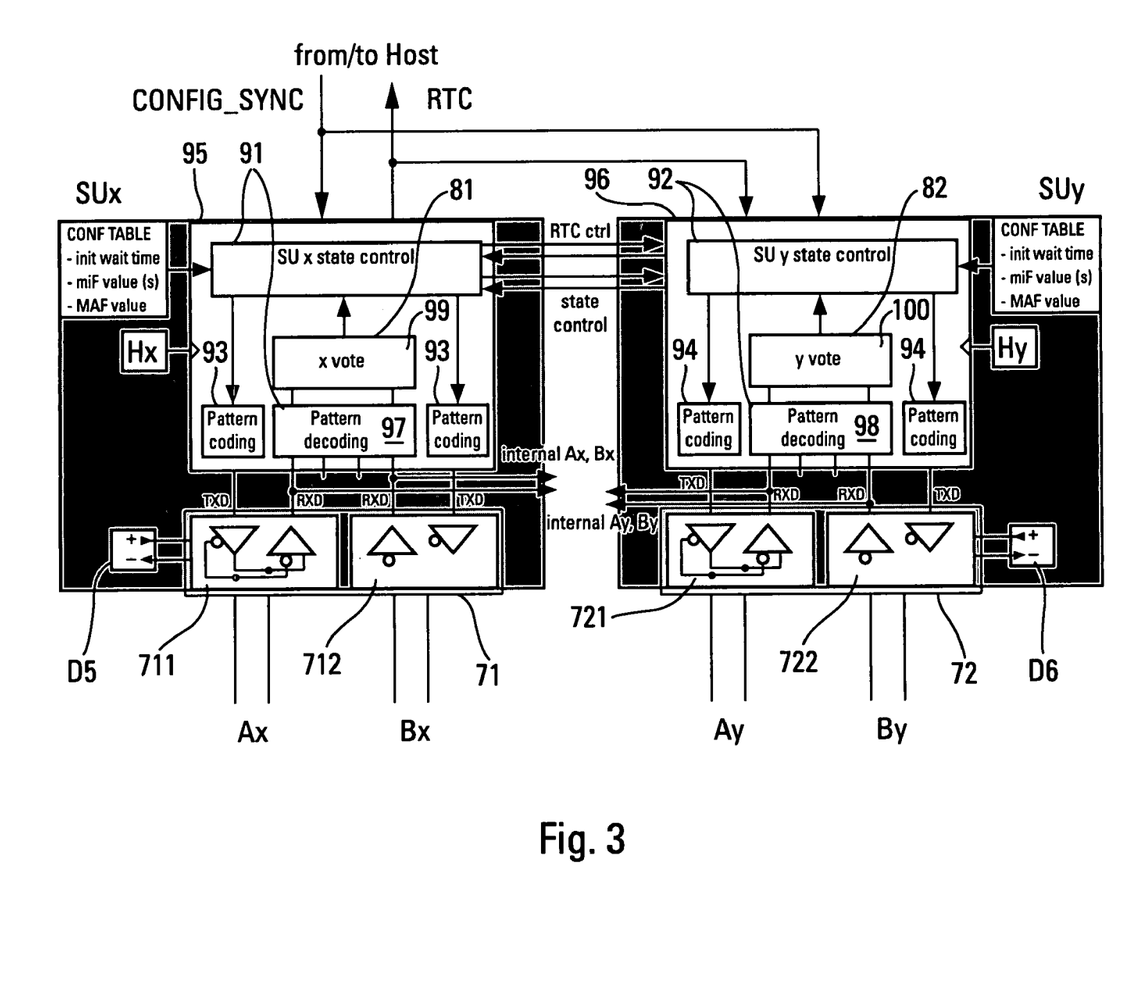
FIG. 3 shows an embodiment of the device according to the invention.

FIG. 3 illustrates a single Sync entity, for example Sync entity 113, in greater detail. The illustrated synchronization entity includes two synchronization units (respectively $SU_x$ and $SU_y$). As shown, each synchronization unit (respectively $SU_x$ and $SU_y$) receives a synchronization configuration signal CONFIG_SYNC from its local processor 110, 210, 220, and sends back thereto a real-time clock signal RTC.

Each unit of the Sync entity (meaning either $SU_x$ or $SU_y$) comprises a local oscillator, illustrated respectively as $H_x$ for synchronization unit $SU_x$ and $H_y$ for synchronization unit $SU_y$. Each unit also comprises a configuration table CONF TABLE, including (i) an initialization wait time value ("init wait time"), (ii) at least a first minor synchronization period value ("miF value (s)") and (iii) a second major synchronization period value ("MAF value"), the latter for describing the cyclic sequencing of the platform in the form "Minor frame/ Major Frame." The latter is used to phase the different processing cycles of the CPU 11, 21 and 22 equipment for reducing the latency of transfers of data exchanged according to the cycle number.

The redundant restoring units, respectively $SU_x$ and $SU_y$, are directly interconnected so as to exchange local real-time clock control signals (shown as "RTC ctrl" signals) and state control signals (shown as "state ctrl" signals)."

As illustrated, a circuit 95 of restoring unit $SU_x$ includes (i) an $SU_x$ state control circuit 91, (ii) pattern coding circuits 93 for pattern coding of signals transmitted from $SU_x$ state control circuit 91 (at TXD), which are transmitted to circuits 711, 712 (as defined below) for transmission to bus 61 as $A_x$, $B_x$, (iii) pattern decoding circuits 97 for pattern decoding of signals received from circuits 711, 712 (at RXD) as $A_x$, $B_x$ signals from bus 61, and (iv) an x vote circuit 99 for determining an $A_x$, $B_x$ vote component of an RTC vote (as defined below) from the $A_x$, $B_x$ signals received from bus 61. For $SU_x$, the combination of elements 91, 93 and 97 may be referred to as a counting circuit for this synchronization unit.

In addition, a counting circuit 96 of restoring unit $SU_y$ includes (i) an $SU_y$ state control circuit 92, (ii) pattern coding circuits 94 for pattern coding of signals transmitted from $SU_y$ state control circuit 92 (at TXD), which are transmitted to circuits 721, 722 (as defined below) for transmission to bus 61 as $A_y$, $B_y$, (iii) pattern decoding circuits 98 for pattern decoding of signals received from circuits 721, 722 (at RXD) as $A_y$, $B_y$ signals from bus 61, and (iv) a y vote circuit 100 for determining an $A_y$, $B_y$ vote component of an RTC vote (as defined below) from the $A_y$, $B_y$ signals received from bus 61. For $SU_y$, the combination of elements 92, 94 and 98 may be referred to as a counting circuit for this synchronization unit.

As noted, each restoring unit (either $SU_x$ or $SU_y$) of each synchronization unit advantageously includes specific circuits (notably circuit 71, comprising circuits 711, 712 for $SU_x$, and circuit 72, comprising circuits 721, 722 for $SU_y$) for connecting to the specific synchronization bus (61). Preferably, these specific circuits 711, 712, 721, 722 will be bidirectional differential drivers of the CAN (controller area network) bus conforming to the specifications of ISO standard 11898 (ISO reference number 11898: 1993(E)), a document to be referred to if necessary in order to understand the operation of the CAN. These circuits are chiefly used in automotive vehicle high-speed data exchange local area networks. An example of this type of circuit is the PCA 82C250 driver of the Philips Semiconductors Company (reference: Data Sheet of Oct. 21, 1997).

These circuits are particularly advantageous by reason of the properties of the "recessive" and "dominant" states on the differential link, which are used by the invention to perform a complete wired connection or connection between several emitters without having a common ground reference between the emitters, over several tens of meters. This property is used in the CAN standard for performing bus arbitration between the different terminals. Each pair of circuits 71, 72 may therefore be connected separately to a specific power supply D5, D6 of the equipment and electrically isolated from the other equipment of the platform.

For further clarification of "recessive" and "dominant" signal states, referring to CAN standard, an exemplary signal $A_x$ transmitted from an exemplary circuit 711 includes a high voltage component and a low voltage component. If the resultant of the high and low component signals is greater than a defined minimum threshold, the resulting signal $A_x$ is defined as a signal having a dominant state, or simply as a dominant signal. On the other hand, if the resultant of the high and low component signals is less than a defined minimum threshold, the resulting signal $A_x$ is defined as a signal having a recessive state, or simply as a recessive signal.

Figure 4:
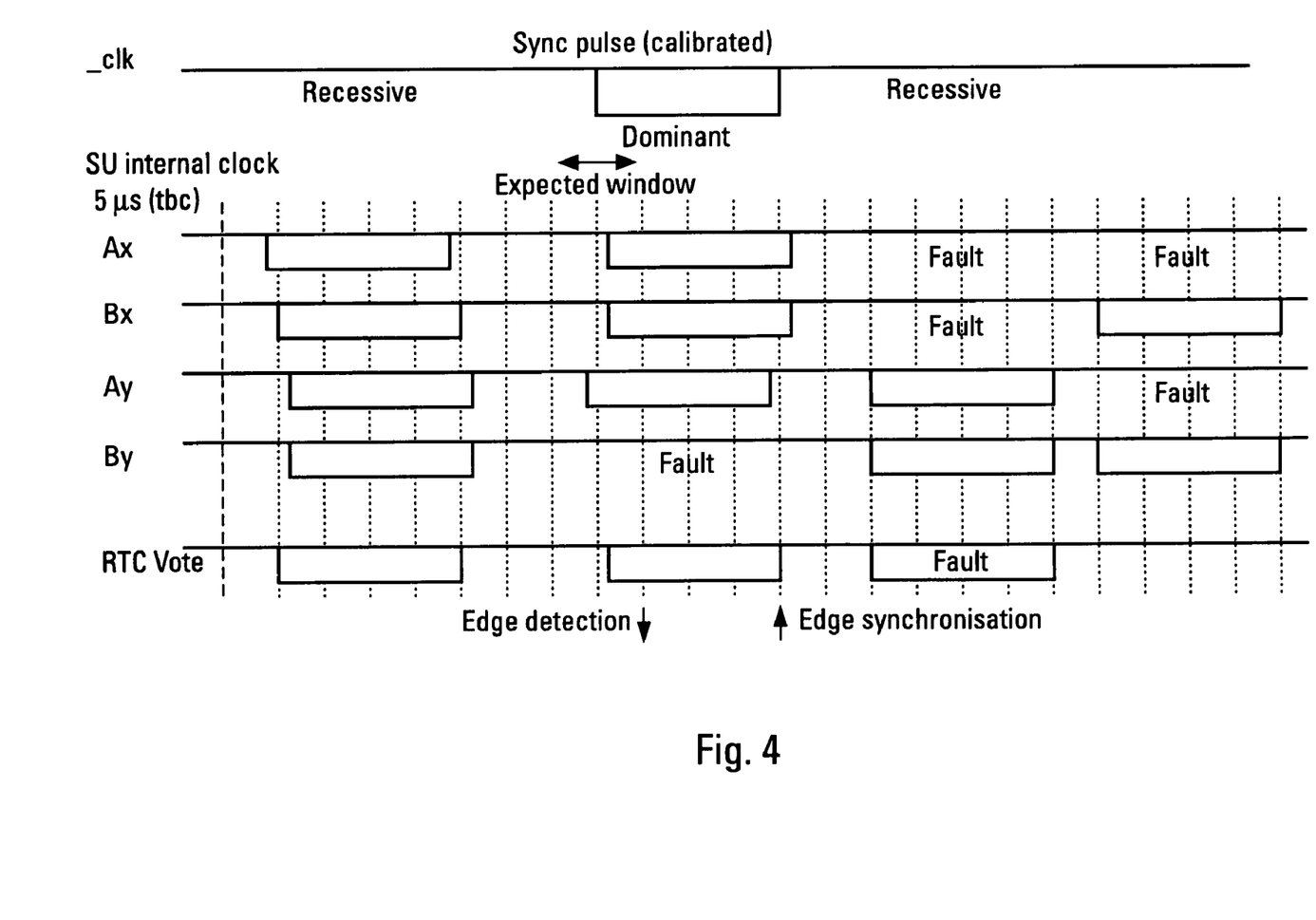
FIG. 4 sets out the voting scheme used to provide a synchronized, reliable real-time clock according to the invention.
Figure 5:
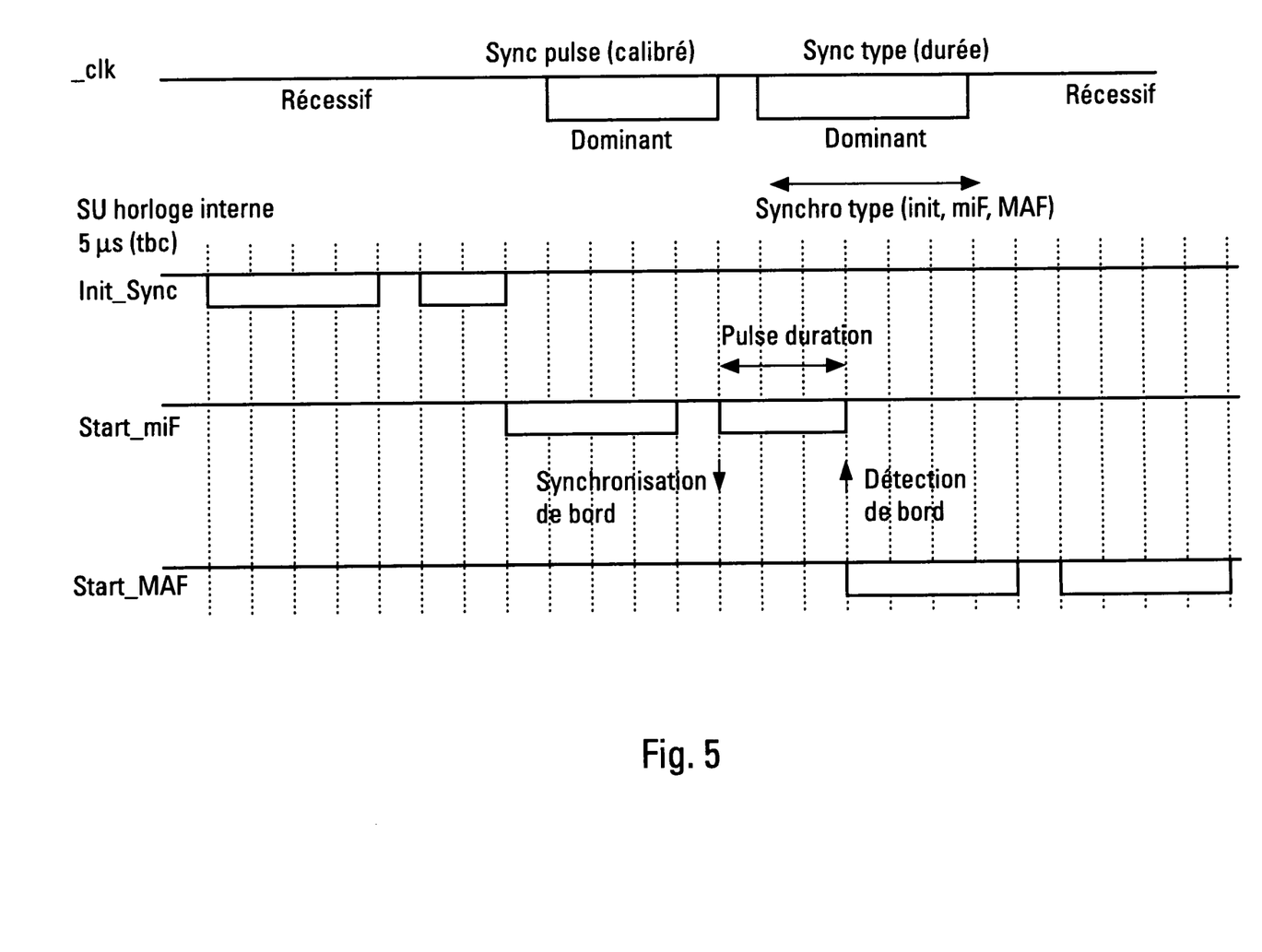
FIG. 5 sets out the coding scheme used for interlacing different modes of synchronization.

In FIG. 4, the synchronization sequence of channels $A_x$, $B_x$, $A_y$, $B_y$ of the "_clk" type uses the local oscillator $H_x$ and $H_y$ of each synchronization unit $SU_x$ and $SU_y$. The sequence includes a calibrated synchronization pulse "Sync pulse (calibrated)" for rephasing the local real-time clock RTC. Referring to FIG. 5, the sequence also includes a synchronization type pulse "Sync type (duration)" for indicating the type of platform cycle (minor-frame/major frame).

Each synchronization pulse comprises a recessive part and a dominant part, as such terms were defined above. From the recessive state, the "_clk" type signal is placed in the dominant state for a few local oscillator periods, then it is placed in the recessive state. The duration of this dominant state depends on the type of pulse.

Each local oscillator (respectively $H_x$ or $H_y$) has a period of approximately 5 μs. The calibrated pulse is generated by the synchronization unit (respectively $Su_x$ or $Su_y$) on its own signals, meaning $A_x$ and $B_x$ for $Su_x$, or alternatively $A_y$ and $B_y$ for $Su_y$. Each synchronization unit (respectively $Su_x$ or $Su_y$) reads the four channels $A_x$, $B_x$, $A_y$, $B_y$. Based on the current state of the signals read on these 4 channels, it performs a vote during an "expected window" of a duration of several periods of the local oscillator (respectively $H_x$ or $H_y$). It detects the coherent switching of the signals on the channels $A_x$, $B_x$, $A_y$, $B_y$ which is called "Edge detection". It also performs "Edge synchronization," which refers to the phasing of the local real-time clock RTC, which takes place in at least three, at most four oscillator periods after edge detection.

FIG. 4 illustrates how the calibrated synchronization pulses generated on the four channels $A_x$, $B_x$, $A_y$, $B_y$ of the specific bus 61 (labeled on the left of the figure) are combined to generate an "RTC vote" (labeled at the left, bottom of the figure) which takes into account both the time shifts of the local oscillators $H_x$ and $H_y$ and the faults of each synchronization unit $SU_x$ and $SU_y$.

The voting result on the four channels is given by the following logic expression:

RTC vote=($A_x$ or $A_y$) and ($B_x$ or $A_y$) and ($A_x$ or $B_y$) and ($B_x$ or $B_y$).

This voting is generally called quadruplex majority voting. It is differentiated from simple quadruplex voting by the elimination of the terms ($A_x$ or $B_x$) and ($A_y$ or $B_y$) respectively originating from a single unit $SU_x$ and $SU_y$, which propagate a Fault in the event of failure of such a single unit.

An RTC vote of 1 indicates a dominant signal result (shown as a box under the RTC Vote section of FIG. 4), and an RTC vote of Ø indicates a recessive signal result (shown as a "Fault" under the RTC Vote section of FIG. 4). The decision table is therefore as follows:

| Ax | Ay | Bx | By | RTC Vote |
|----|----|----|----|----------|
| 1 | 1 | 1 | 1 | 1 |
| 1 | 1 | 1 | 0 | 1 |
| 1 | 1 | 0 | 1 | 1 |
| 1 | 1 | 0 | 0 | 0 |
| 1 | 0 | 1 | 1 | 1 |
| 1 | 0 | 1 | 0 | 1 |
| 1 | 0 | 0 | 1 | 0 |
| 1 | 0 | 0 | 0 | 0 |
| 0 | 0 | 1 | 1 | 0 |
| 0 | 0 | 1 | 0 | 0 |
| 0 | 0 | 0 | 1 | 0 |
| 0 | 0 | 0 | 0 | 0 |
| 0 | 1 | 1 | 1 | 1 |
| 0 | 1 | 1 | 0 | 0 |
| 0 | 1 | 0 | 1 | 1 |
| 0 | 1 | 0 | 0 | 0 |

The accuracy of the internal local oscillator $H_x$ (respectively $H_y$) of the synchronization unit $SU_x$ (respectively $SU_y$) will be chosen equal to or better than 100 ppm so that for a synchronization period miF of 50 ms for example, the tolerance on the drift of the local real-time clock RTC will be less than one period of the local oscillator, i.e. 5 μs (with a transmit byte clock, or tbc used). If the drift is greater than this amount, then it will be a fault, not a vote.)

FIG. 5 explains the way in which the type of synchronization is coded. The "Sync type (duration)" pulse follows the calibrated synchronization pulse. The code corresponds to three different values of the pulse times (for example 2, 3 and 4 local oscillator periods). The three values represent the following instructions:

| | |
|---|---|
| Init_Sync | Initiate a synchronization sequence |
| Start_miF | Start a miF type sequence |
| Start_MAF | Start a MAF type sequence |

A miF (minor frame) sequence corresponds to an elementary period of the local real-time clock RTC 112, that is, a few tens of milliseconds. A MAF (major frame) sequence corresponds to a succession of different miFs until the resumption of the initial miF. The period of the MAF can be several orders of magnitude greater than miF, e.g., 100 times, that is, a few seconds. These values depend on the types of equipment that we wish to synchronize, the optimum MAF value having to be adjusted to a value determined from the lowest common multiple of the miFs. Example: 100 cycles of 10 ms miF form a MAF cycle of 1 s.

Voting is also performed on the synchronization type.

The encoding, decoding, voting on the code and controlling the state of the synchronization unit are performed by a programmable logic circuit 91, 92.

Figure 6:
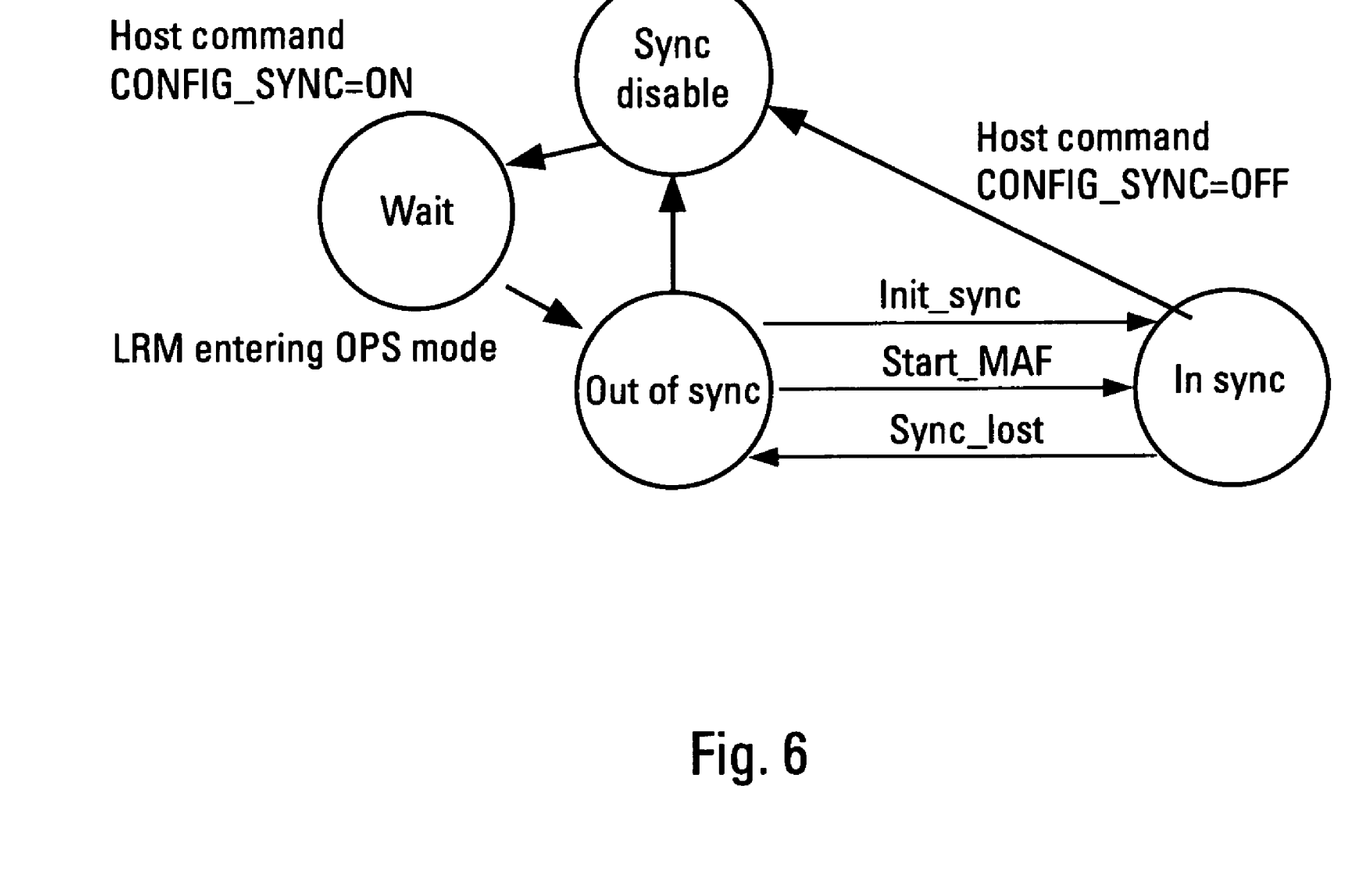
FIGS. 6, 7 and 8 depict some states of the device according to the invention in operation.
Figure 7:
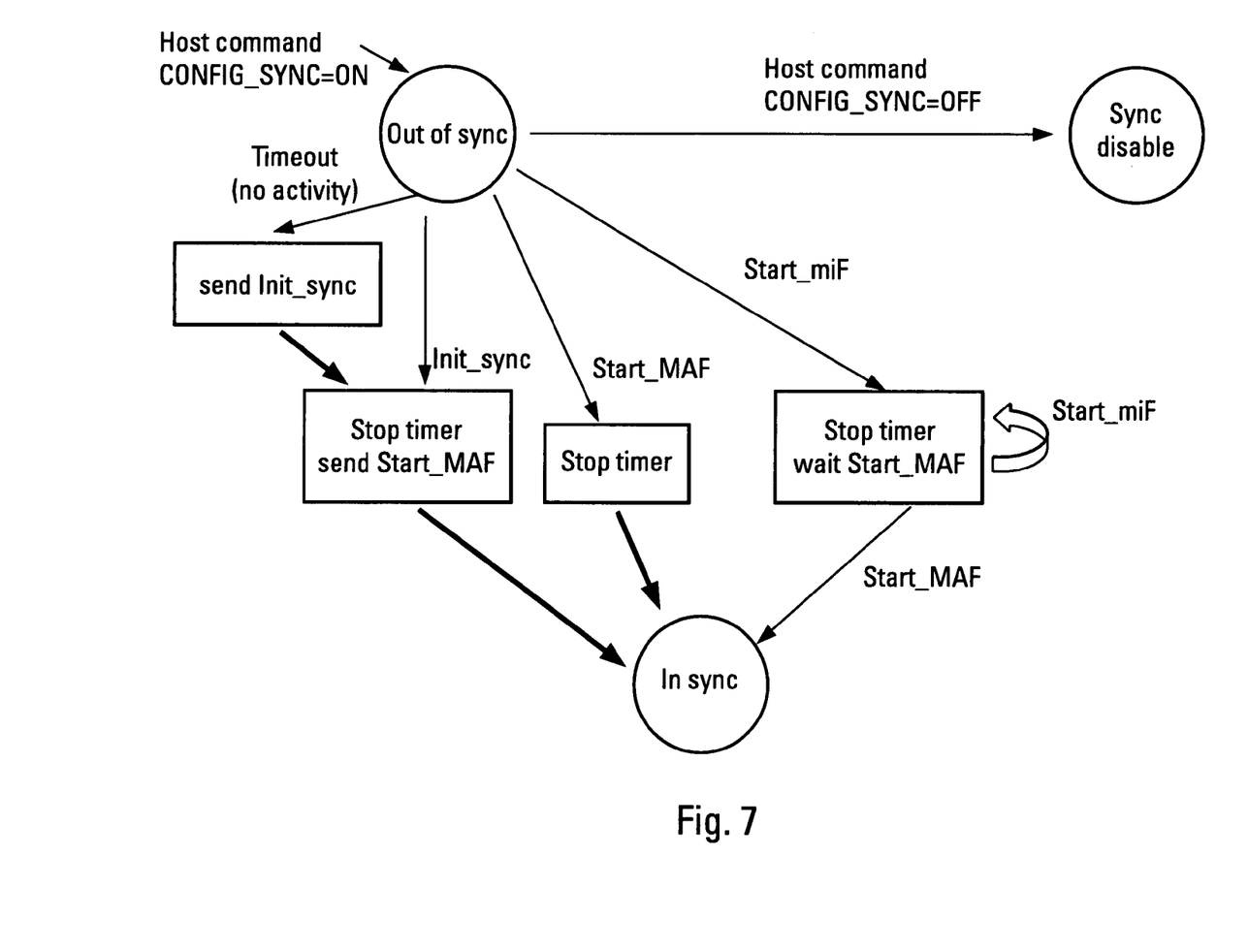
Figure 8:
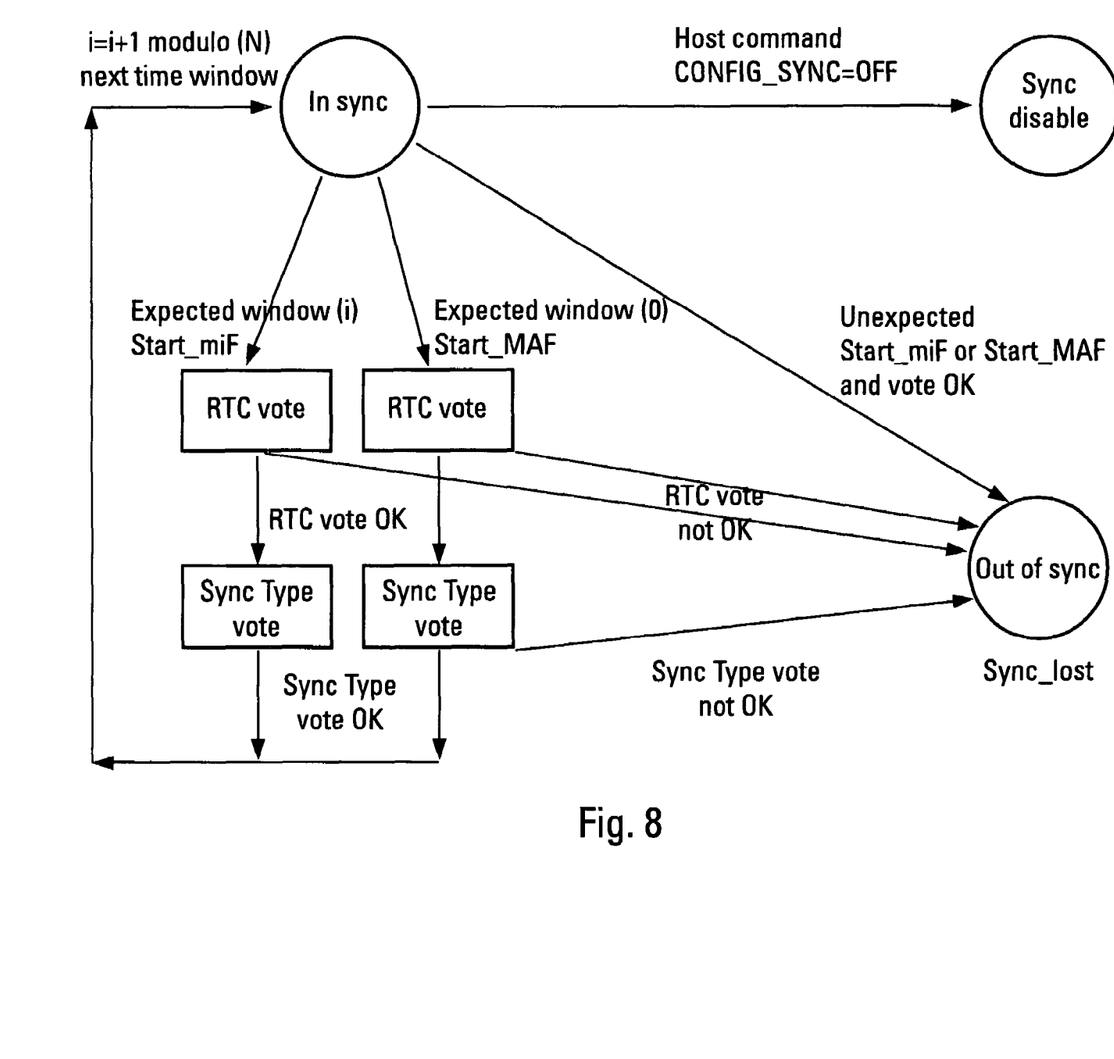

FIGS. 6, 7 and 8 show the main state transition diagrams.

FIG. 6 shows a general view of the transitions between the states: "Sync disable" state (a state where the synchronization mechanism of the synchronization unit is disabled), "Wait" (a state where the synchronization mechanism of the synchronization unit awaits a Host command to enter another state, as described below), "In sync" (a state where the synchronization mechanism of the synchronization unit is considered to be synchronized) and "Out of sync" (a state where the synchronization mechanism of the synchronization unit is considered to be not synchronized). The transitions from/to the "Sync disable" state are triggered by commands from the local processor (Host command: CONFIG_SYNC=ON/OFF). Specifically, if the local processor indicates Host command: CONFIG_SYNC=OFF, the Sync disable state is entered from the In Sync state, whereas if the local processor indicates Host command: CONFIG_SYNC=ON, the Wait state is entered from the Sync disable state.

After a CONFIG_SYNC=ON command, the synchronization unit $SU_x$ and $SU_y$ changes to the "Wait" state. The processing unit enters an operational phase, and places itself in the "Out of sync" state waiting for an "Init_Sync" or "Start_MAF" sequence.

An "Init_sync" sequence is sent by the synchronization unit if no activity is detected before the end of the waiting period. A "Start_MAF" sequence is sent after the "Init_Sync" sequence. One of these two sequences triggers the transition from the "Out of sync" state to the "In sync" state.

FIG. 7 shows more precisely how the time dimension fits into this state transition, together with the miF sequence.

The transition from the "In sync" state to the "Out of sync" state is triggered by the Sync_lost sequence generated if $SU_x$, $SU_y$ receives a synchronization pulse outside the "expected window" (RTC vote=Ø) or if there is disagreement over the type of synchronization (Sync Type vote=Ø).

FIG. 8 details these transitions of state taking into account the two votes, the two synchronization frames (miF and MAF) and the iterations (i=i+1: "next time window"). The voting on the synchronization types can advantageously comprise the aforementioned quadruplex majority voting type among the four channels.

In one embodiment, the ratio of the major cycle period to that of the minor cycle is between 2 and 10000.

The invention is not limited to networks for equipment on board aircraft. It can also be applied to local area networks (LANs) and to networks for equipment on board ships.

The invention claimed is:

1. A method of synchronizing local real-time clocks of a plurality of computer components via synchronization units of each of said plurality of computer components communicating together comprising: receiving a configuration signal from a local processor of a first computer component separate from a data transfer bus; generating on differential lines one or more outbound synchronization pulses with dominant and recessive states for transmission over a synchronization bus common to the synchronization units; receiving from said synchronization bus one or more inbound synchronization pulses; performing quadruplex majority voting by eliminating synchronization pairs originating from a same synchronization unit; synchronizing the local real-time clocks based upon any one of minor and major cycles; implementing a multiple operation state control of a synchronization unit, wherein a transition from an Out of sync operating state to an In sync operating state is triggered by a sending of a first code Start_miF or of a second code Start_MAF, and a transition from the In sync operating state to the Out of sync operating state is triggered by a fault vote on three codes comprising Init_sync, Start_miF, and Start_MAF; and resynchronizing a real-time clock synchronization signal for transmission to a second computer component based upon processing of said configuration signal and said one or more inbound synchronization signals.

2. The synchronization method of claim 1, wherein said synchronizing of the local real-time clocks is achieved by any one of minor and major cycles of multiple periods of the local real-time clocks.

3. The synchronization method of claim 2, wherein a ratio of the major cycle periods to that of the minor cycle is a value between 2 and 10000.

4. The synchronization method of claim 1, wherein said synchronizing of the local real-time clocks is based upon minor and major cycles of multiple periods.

5. The synchronization method of claim 4, wherein a ratio of the major cycle periods to that of the minor cycle is a value between 2 and 10000.

6. The synchronization method of claim 1, further comprising encoding four calibrated synchronization signals.

\* \* \* \* \*